United States Patent [19]

Fritzer

[11] Patent Number: 5,019,844
[45] Date of Patent: May 28, 1991

[54] CAMERA CONSTRUCTION AND METHOD OF USING SAME

[76] Inventor: Robby D. Fritzer, 11679 Via Paloma, El Cajon, Calif. 92019

[21] Appl. No.: 282,405

[22] Filed: Dec. 9, 1988

[51] Int. Cl.[5] .................... G03B 15/00; G03B 41/00
[52] U.S. Cl. ............................... 354/120; 354/109; 354/150
[58] Field of Search ............... 354/105, 106, 109, 110, 354/120, 220, 150; 352/94

[56] References Cited

U.S. PATENT DOCUMENTS

| | | | |
|---|---|---|---|
| 1,879,949 | 9/1932 | Pinkosh | 354/220 |
| 2,589,363 | 3/1952 | Foufounis | 354/220 |
| 2,830,512 | 4/1958 | Nagel | 354/120 |
| 3,016,790 | 1/1962 | Nakamatsu | 352/94 |
| 3,069,987 | 12/1962 | Harrington | 354/120 |
| 4,053,910 | 10/1977 | Bodnar | 354/120 |
| 4,240,731 | 12/1980 | Staffieri | 354/114 |
| 4,560,261 | 12/1985 | Ueda et al. | 354/220 |
| 4,708,449 | 11/1987 | Thomas | 354/295 |

*Primary Examiner*—A. A. Mathews
*Attorney, Agent, or Firm*—Bernard L. Kleinke; Jerry R. Potts; William Patrick Waters

[57] ABSTRACT

A camera construction includes a front primary lens to focus a primary image of an object to be photographed, onto a film frame of a photosensitive film. A rear secondary lens and a reversely bent light path arrangement focuses an image of the user onto a portion of the same film frame of the film. A rear external mirror enables the photographer to align properly his or her image relative to the rear secondary lens.

In use, the photographer focuses on the primary object of the picture, and then positions the camera at approximately arm's length, while maintaining the primary object in focus. The photographer then aligns his or her face relative to the rear mirror so that when the user sees his or her image in the rear mirror, the user's image is properly aligned with the rear lens. Upon obtaining this orientation, the shutter release of the camera construction is activated to expose both of the front and rear images simultaneously to the same film frame.

14 Claims, 1 Drawing Sheet

U.S. Patent   May 28, 1991   5,019,844
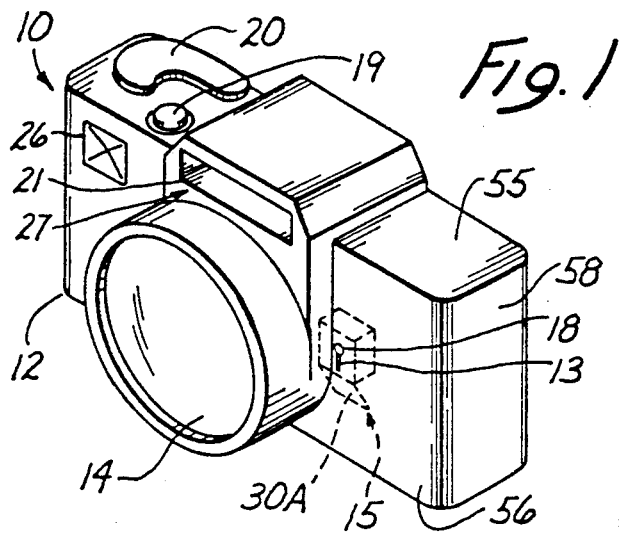
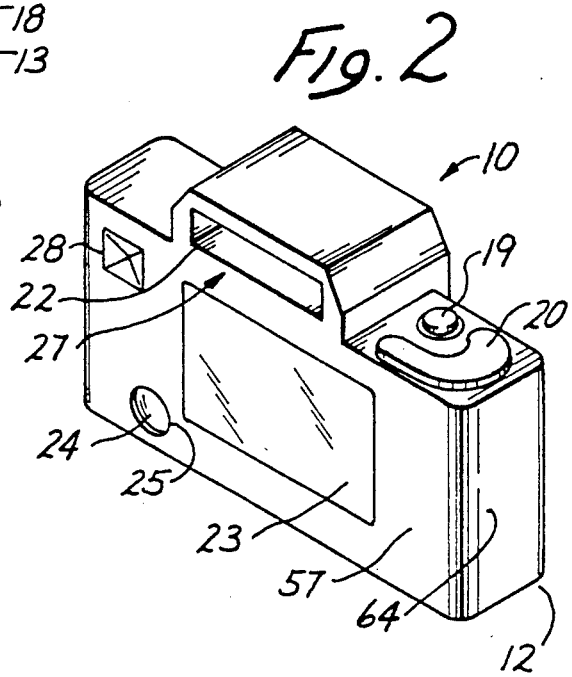
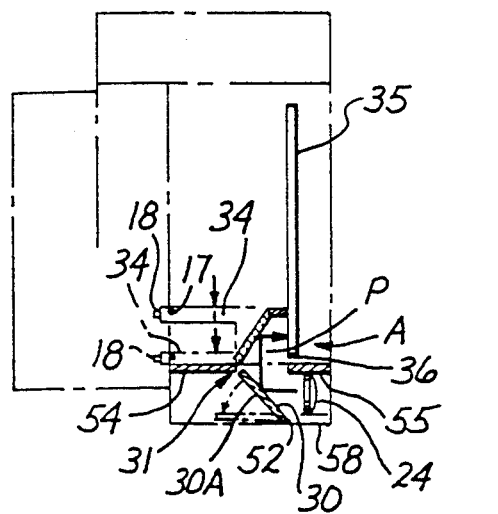
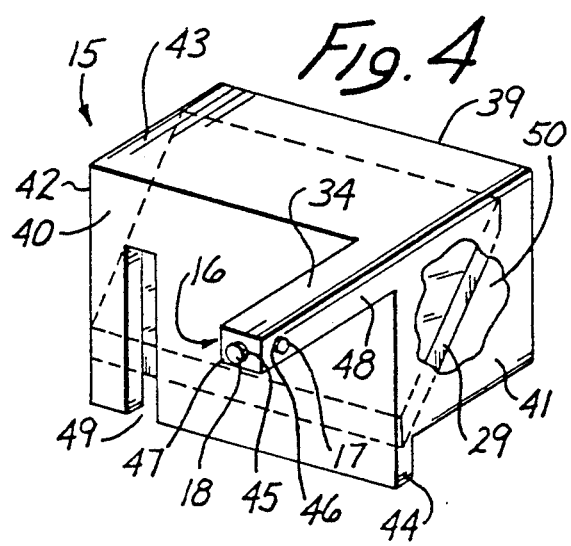
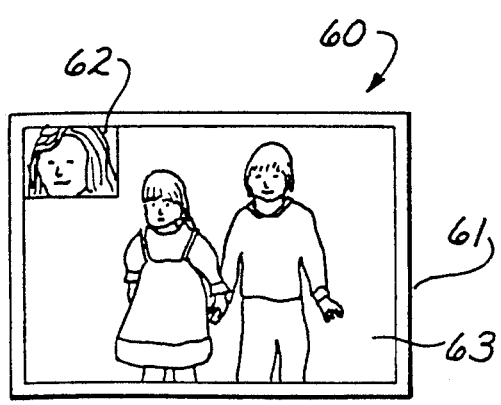

CAMERA CONSTRUCTION AND METHOD OF USING SAME

DESCRIPTION

1. Technical Field

The present invention relates in general to camera construction and a method of using it, and more particularly it relates to a new and improved camera construction for enabling multiple images to be photographed simultaneously.

2. Background Art

Cameras have been employed for many years, and are all of a generally similar design. In using such cameras however, it has been difficult, if not impossible, for the operator of the camera to be included in the photograph. In this regard, elaborate and expensive time delay devices have been employed for activating automatically a camera lens shutter after a given time delay period. In this manner, the operator can activate a shutter release, and then step in front of the camera lens so that he or she can be photographed, after the time delay interval.

Such an approach is not entirely satisfactory for all situations, because it is oftentimes awkward to perform such an operation. Also, time delay photography does not, of course, lend itself to taking a series of photographs repeatedly, while including the operator in the photographs.

Therefore, it would be highly desirable to have a new and improved camera design, which enables a person taking a photographic picture, to be included in the photograph, without the use of elaborate time delay shutter devices or the like.

Such a new camera construction should also be relatively inexpensive to manufacture so that a person can afford to purchase such a camera. Moreover, such a new camera construction should be able to utilize standard film cartridges and the like, so that special films are not required.

Therefore, it would be desirable to have such a camera construction while utilizing conventional film, could enable the user to determine selectively whether or not he or she would be included in the photograph to be taken, along with the object to be photographed.

Additionally, such a new construction should be useful for various types and kinds of cameras, including still cameras, motion picture cameras, video cameras and the like.

DISCLOSURE OF INVENTION

Therefore, it is the principal object of the present invention to provide a new and improved camera construction, and a method of using it, so that a user of such a camera construction may be photographed, together with the other objects to be photographed, in a simultaneous manner, without the need for time delays.

Another object of the present invention is to provide such a new and improved camera construction which utilizes conventional film and which can be manufactured inexpensively.

Briefly, the above and further objects of the present invention are realized by providing a new and improved camera construction, and method of using it, so that a person using such a camera construction may be included selectively in any photograph he or she might be taking, without utilizing time delays.

The camera construction includes a primary front lens to focus a primary image of an object to be photographed, onto a film frame of a photosensitive film. A user secondary lens and a reversely bent light path arrangement focuses an image of the user onto a portion of the same film frame of the film. As a result, when the film is developed, the image of the photographer appears on a portion of the photograph, along with the primary object. A rear external mirror enables the photographer to align properly his or her image relative to the rear secondary lens.

In use, the photographer first focuses on the primary object of the picture, and then positions the camera at approximately arm's length, while maintaining the primary object in the focus. The photographer then aligns his or her face relative to the rear external mirror, so that when the user sees his or her image in the rear mirror, the user's image is properly aligned with the rear lens. Upon obtaining this orientation, the shutter release of the camera construction is activated to expose both of the front and rear images simultaneously to the same film frame.

BRIEF DESCRIPTION OF DRAWINGS

The above mentioned and other objects and features of this invention and the manner of attaining them will become apparent, and the invention itself will be best understood by reference to the following description of an embodiment of the invention in conjunction with the accompanying drawings, wherein:

FIG. 1 is a front and left side pictorial view of a camera construction, according to the present invention;

FIG. 2 is a rear and right side pictorial view of the camera construction of FIG. 1;

FIG. 3 is a reduced scale diagrammatic left side view of the camera construction of FIG. 1;

FIG. 4 is an enlarged scale pictorial view of an on/off control assembly of FIG. 1; and FIG. 5 is a face view of a resulting photograph taken by the camera of FIG. 1.

BEST MODE FOR CARRYING OUT THE INVENTION

Referring now to the drawings, and more particularly to FIGS. 1-3 thereof, there is shown a camera construction 10, according to the present invention. The construction 10 may be used to take a picture of any given object, while at the same time, simultaneously taking a picture of the photographer using the camera construction 10. While the camera construction 10 shown and described herein is for a still camera, the inventive camera construction may also be for a motion picture camera, a video camera, or the like.

The camera construction 10 generally comprises a box-like hollow camera body 12. The camera body 12 is of unitary construction composed of a suitable material such as thermoplastic material and includes a top portion 55, a front wall portion 56, a rear wall portion 57, a base portion 58, and a pair of side wall portions 59 and 64 that interconnect the other portions 55, 56, 57 and 58 of the camera body 12. The camera body 12 also includes a slit-like elongated slot, through which access may be gained to an on/off control assembly 15, as hereinafter described in greater detail. The slot 13 is disposed on the front wall 56 of the camera adjacent to a primary front lens 14.

As best illustrated in FIGS. 1 and 5, the on/off control assembly 15 is disposed within the hollow interior of the camera body, and is moved manually upwardly and downwardly into and out of the field of focus of the primary object images from the front lens 14 onto a film frame of a photosensitive conventional film 35. As shown in FIG. 4, the slot 13 and permits self photographing feature of the camera 10 to be activated or deactivated manually selectively by a user.

For the purpose of assuring the proper activation of the self photographing feature, the on/off control assembly 15 includes a handle or forwardly projecting member 34 having a release mechanism 16. The release mechanism 16 includes a movable detent 17, which is connected to a button 18, and which is adapted to cooperate with a detent opening (not shown) inside the camera body. The detent 17 retains releasably the on/off control switch assembly 15 in one of two selected discrete positions.

In operation, in order to activate the self photographing feature of the camera 10, the user moves the on/off control assembly 15 manually to the ON or activated position.

In order to activate the control assembly 15, the user first presses downwardly manually the button 18 extending forwardly through the access slot 13, with the tip of one of his or her fingers, and simultaneously upwardly slides the assembly handle 34 from its downwardly disposed OFF position as shown broken lines in FIG. 3, into its upwardly disposed ON position, as shown schematically in FIG. 3 interposed between the front lens 14 and the film frame of the film 35. The button 18 when depressed causes detent 17 to retract, thereby enabling the assembly 15 to be slide from one discrete position to another by the camera user.

To deactivate the self photographing feature, the reverse process is performed. For example, the user first depresses the button 18 and then simultaneously downwardly slides manually the assembly handle 34 from the upper ON position shown in FIG. 1, to the lower OFF position as shown broken lines in FIG. 3.

The camera construction 10 also includes a shutter release control button 19 on the top wall 55, and a film advance handle 20 disposed on the top portion 55 near the button 19 for convenient activation by a user. For the purpose of assisting a user of the camera in composing properly a picture, the camera 10 also includes an oversized direct-view viewfinder generally indicated at 27 having a front portion 21 centrally disposed directly above the front primary lens 14 on the top portion 55 of the camera 10. The viewfinder 27 also includes a rear viewing portion 22 disposed on the central upper rear portion 57 of the camera construction 10. The camera construction 10 also includes a centrally disposed rearwardly facing concave mirror 23 disposed directly opposite the front primary lens 14 on the rear side of the camera construction 10 to assist the user to align properly his or her face relative to a rear secondary lens 24 recessed within an aperture or opening 25 in the camera body 12. The aperture 25 is disposed adjacent to the lower left corner of the mirror 23. The rear lens 24 is positioned adjacent to the mirror 23 so that it will receive a real image of the face of the photographer when the photographer's facial image is aligned within the mirror 23. In this manner, as hereinafter explained in greater detail, the rear lens focuses an image of the face of the user onto the same film frame as the image received from the front lens.

For the purpose of providing a proper amount of lighting for photography purposes, the camera construction 10 also includes a pair of front and rear flash units 26 and 28 which are disposed on the front wall 56 and rear wall 57 of the camera construction, respectively.

When the self photographing feature of the camera construction 10 is activated by the user moving manually the control handle 34 to its upper or ON position, the user's image is focused onto the film frame via a reversely bent light path P (FIG. 3), as indicated by the arrow P, extending from the rear lens 24, an angularly rearwardly facing mirror 30, and an angularly rearwardly facing mirror 29 to the film frame to be exposed. The mirror 29 is disposed within the assembly 15 and is positioned and aligned above the lower mirror 30 so that any object image received by the rear secondary lens 24 is focused onto the lower left corner of the film frame area (generally shown at A), of the film 35, as oriented within the rear portion of the interior of the camera construction 10. When the assembly 15 is disposed in its upper activated position, it also partially blocks the real image received by the front primary lens 14 from being projected onto the film area, generally shown at A, so that only the image received by the rear secondary lens 24 is projected onto that area of the film frame 55.

When the user reverses the above process by moving the handle 34 downwardly, the on/off control assembly 15 engages an upper edge portion 31 of a plate 30A pivotally mounted at its bottom edge and bearing the lower mirror 30 on its rear face, so that the plate 30A and thus the mirror 30 swings downwardly into a closed or deactivated position as shown in broken lines in FIG. 3. When the on/off control switch assembly 15 is disposed in the closed or deactivated position, the object image received by the rear secondary lens 24 is blocked by the assembly 15 to prevent light from being projected onto the film 35 from the rear lens 24. Also, when the assembly 15 is disposed in the deactivated lower position, it enables the object image received by the front primary lens 14 to be projected onto the entire film frame area in a conventional manner, without taking the picture of the user.

Considering now the on/off control assembly 15 in greater detail with reference to FIG. 4, the on/off control switch assembly 15 includes a hollow body housing member 39, which has a unitary construction, and which is composed of a suitable material such as a thermoplastic material. The housing member 39 is generally a rectangularly-shaped hollow box having an open rear and a front wall 40, two end walls 41 and 42 and a top wall 43. The rear and bottom portions of the housing member 39 are open.

As best seen in FIG. 4, the end walls 41 and 42 are generally square shaped and are connected together by the front wall 40. Front wall 40 is generally rectangularly shaped and includes an integrally downwardly depending lip or stripe 44 extending along its entire lower marginal edge.

As best seen in FIG. 4, the front wall 40 further includes the integral forwardly projecting rodlike handle 34 extending forwardly from the upper left corner of the front face thereof. The handle 34 is generally rectangular in cross section shape throughout its axial length and has a uniform cross sectional thickness. The handle 34 includes a pair of holes 45 and 46. Hole 45 is located in the terminal end 47 of the handle 34 and is adapted to receive the button 18. Hole 46 is a cross hole located on a side portion 48 of the handle 34 adjacent to its terminal end 47 and receives the detent 17. When button 18 of the release mechanism 16 is depressed, the detent 17 retracts allowing the housing assembly to be moved upwardly or downwardly within the guide slot 13 receiving and confining the button 18. It should be understood when the switch assembly 15 reaches the upper and lower limits of its up and down travel path, detent 17 snaps outwardly into a detent opening that is disposed within the walls of the camera body at the guide slot 13.

Considering now the upper mirror 29 of the assembly 15 in greater detail with reference to FIGS. 3 and 4, the mirror 29 is mounted by any conventional technique, such as by an adhesive, within the interior 50 of the housing 39. The mirror extends between the top wall 43 and front wall 40 of the housing member 39 at approximately a 45° angle so that any upwardly directed light reflected by the lower mirror 30 is received and reflected by the upper mirror 29 onto the lower left portion of the film in the general area designated by A in FIG. 3. It should be understood that the upper and lower mirrors 29 and 30 are approximately the same size.

Considering now the lower mirror 30 in greater detail with reference to FIGS. 1, 3, and 5, the lower deviating mirror 30 is mounted on the rearwardly inclined plate 30A, which is, in turn, mounted to the bottom wall 58 of the camera body 12 at an approximate angle of 45° relative to the bottom wall of the camera construction.

The plate 30A is pivotally mounted by one of its ends to the bottom wall 58 of the camera body 12 by a spring biased hinge 52 that resiliently urges the support arm 30A into a rearwardly inclined position at approximately 45° relative to the front wall 57 of the camera.

The plate 30A is generally rectangularly shaped and is composed of a suitable material such as a thermoplastic material. The opposite end 53 of plate 30A (when the support arm is in its raised position), is positioned in mating engagement along the entire axial length of edge or lip 44 of the housing member 39.

As best illustrated in FIG. 3, when the on/off control assembly 15 is lowered to its deactivated position, lip 44 matingly engages the upper edge of the plate 30A to force it downwardly so that the plate 30A swings in a counter clockwise direction as viewed in FIG. 3, until it comes to rest flat against the bottom wall 38 of the camera body 12. It should be understood that when the control assembly 15 is moved to its activated position, the restraining force applied against the plate 30A by the assembly 15 is removed, thereby allowing the biasing force of the spring hinge 52 to raise the plate 30A upwardly to its fully extended position.

When the assembly 15 is lowered to its deactivated position, the top wall 43 of the assembly 15 is disposed directly opposite and adjacent to the lowermost portion 30 of the film 35. In this manner, the full film frame 35 may be exposed to the image received by the front primary lens 14. Also when the assembly is lowered to the deactivated position, the front terminal edge of the top wall 43 is disposed in alignment with an inner floor or wall 55 connected at its rear edge to the rear wall 32 of the camera body 12, to seal off the light compartment for the front lens to render it light tight. Thus, in its lower position, the assembly 15 is positioned entirely out of the field of focus of the front lens onto the film, and is disposed directly therebelow to seal off the light chamber for the front lens.

As best seen in FIG. 3, the lower mirror 30 is mounted on the rear face of the plate 30A so that the mirror 30 is disposed directly opposite the rear secondary lens 24 so that it reflects the sharply focused images projected by the lens 24 upwardly into the reflective surface of the upper mirror 29.

Considering now the photograph 60 in FIG. 5, the photograph 60 includes a photograph area 61 that is divided into two image areas 62 and 63. Image area 62 is located in the upper right corner of the photograph 60 and includes approximately eleven percent of the total photograph area 61. The remaining portion of the photograph area or approximately eighty-nine percent, includes the area 63. While the preferred ratio between the two image areas is 11:89, it should be understood that other ratios could be chosen depending on the film size utilized by the camera 10.

While a particular embodiment of the present invention have been disclosed, it is to be understood that various different modifications are possible and are contemplated within the true spirit and scope of the appended claims. For example, in order to help the user know where the user's image will appear, a shaded area (not shown) in or on the viewfinder will alert the user to know where to position the objects in front of the camera. There is no intention, therefore, of limitations to the exact abstract or disclosure herein presented.

What is claimed is:

1. In a camera construction, an arrangement comprising:
   forwardly directed front lens means for focusing a primary image of an object to be photographed, onto a frame area;
   rearwardly directed rear lens means for focusing a secondary image of a different object onto a different portion of the same frame area;
   reversely bent light path means for reproducing said focused secondary image onto said different portion of the same frame area;
   common shutter release means for enabling said primary and secondary images to be exposed simultaneously onto different portions of the same frame area.

2. A camera construction according to claim 1, further including:
   a camera body having a slit-like elongated slot being disposed on the front side thereof;
   control means for selectively activating a self photographing feature; and
   said control means including detent means for retaining selectively said control means in a desired discrete position.

3. A camera construction according to claim 2, wherein said control means includes a member of unitary construction, having an elongated rodlike member and a button member, for controlling said control means within said slot.

4. A camera construction according to claim 3, wherein said control means further includes a housing member having a deviating mirror disposed therein for receiving and reflecting said focused secondary image, said deviating mirror forming part of said reversely bent light path means.

5. A camera construction according to claim 4, wherein said path means includes reflecting means inclined rearwardly at about a 45 degree angle to the bottom of the camera construction for receiving and reflecting the focused secondary image projected by said rear lens means.

6. A camera construction according to claim 5, wherein said reflecting means includes a hingedly mounted plate having a receiving mirror disposed on one surface thereof, said receiving mirror forming another part of said path means.

7. A camera construction according to claim 6, wherein the mounting hinge is a spring hinge.

8. A camera construction according to claim 7, wherein the spring hinge releasably holds the plate at an angle projecting upwardly and away from the rear of the camera construction.

9. A camera construction according to claim 8, wherein the angle of projections is approximately 45 degrees relative to the bottom of the camera construction.

10. A camera construction according to claim 4, wherein said housing member includes an integral downwardly projecting lip extending along the entire axial width of said housing member.

11. A camera construction according to claim 4, wherein said housing member has a slit-like slot extending along substantially the entire axial height of said housing, said slot being disposed in a part of said lip to enable the housing member to be positioned in a fixed spaced apart manner from the front of the camera body.

12. A camera construction according to claim 11, wherein said camera body includes means for retaining said control means in alignment with said receiving mirror.

13. A camera construction according to claim 12, wherein said means for retaining is an alignment arm.

14. A method for exposing photographic film for forming a primary image of a front object and a secondary image of a rear object on a single frame of film, comprising:

using a camera having a forwardly directed primary image taking lens and a rearwardly directed secondary image taking lens, said camera having common shutter release means for enabling photographic film contained in said camera to be exposed;

positioning said camera between the front object and the rear object;

focusing said primary image in a forwardly directed light path extending between said primary lens and a frame area of photographic film to be exposed;

focusing said secondary image in a reversely bent light path extending between said secondary lens and a different portion of said frame area of film; and activating said shutter release means to cause said primary and secondary images to be exposed onto different portions of the same frame area of said film.

* * * * *